United States Patent
Stein et al.

(10) Patent No.: US 10,104,113 B1
(45) Date of Patent: Oct. 16, 2018

(54) USING MACHINE LEARNING FOR CLASSIFICATION OF BENIGN AND MALICIOUS WEBPAGES

(71) Applicant: AREA 1 SECURITY, INC., Menlo Park, CA (US)

(72) Inventors: Peter Stein, Oak Park, IL (US); Andrea Li, Vienna, VA (US); Tamar Weseley, Weston, CT (US); Jesse Collins, Brisbane (AU); Ali Soylemezoglu, Istanbul (TR)

(73) Assignee: Area 1 Security, Inc., Menlo Park, CA (US)

( * ) Notice: Subject to any disclaimer, the term of this patent is extended or adjusted under 35 U.S.C. 154(b) by 216 days.

(21) Appl. No.: 15/166,135

(22) Filed: May 26, 2016

(51) Int. Cl.
 *H04L 29/06* (2006.01)
(52) U.S. Cl.
 CPC ................... *H04L 63/1433* (2013.01)
(58) Field of Classification Search
 CPC .................................................... H04L 63/1433
 USPC .......................................................... 726/25
 See application file for complete search history.

(56) References Cited

U.S. PATENT DOCUMENTS

| | | | |
|---|---|---|---|
| 7,519,954 B1 | 4/2009 | Beddoe | |
| 8,078,625 B1 * | 12/2011 | Zhang | ............... G06F 17/30873 707/748 |
| 8,943,588 B1 | 1/2015 | Speegle | |
| 9,363,282 B1 | 6/2016 | Yu | |
| 2007/0073704 A1 * | 3/2007 | Bowden | ............. G06F 17/30867 |
| 2014/0259158 A1 * | 9/2014 | Brown | ................... G06F 21/554 726/22 |
| 2015/0206169 A1 * | 7/2015 | Ye | ....................... G06Q 30/0242 705/14.41 |
| 2015/0365305 A1 | 12/2015 | Namata | |
| 2016/0232154 A1 | 8/2016 | Hoskinson | |
| 2017/0026391 A1 | 1/2017 | Abu-Nimeh | |

OTHER PUBLICATIONS

Stein, U.S. Appl. No. 15/158,253, filed May 18, 2016, Office Action, dated Dec. 26, 2017.

* cited by examiner

*Primary Examiner* — Longbit Chai
(74) *Attorney, Agent, or Firm* — Hickman Palermo Becker Bingham LLP (57) ABSTRACT

In an embodiment, a data processing method providing an improvement in computer security, comprises selecting a uniform resource location (URL) for classification wherein the selected URL is associated with a webpage; determining a URL risk score for the selected URL; comparing the URL risk score to a URL risk threshold; in response to determining that the URL risk score exceeds the URL risk threshold, determining a maliciousness risk score for the webpage content associated with the selected URL; comparing the maliciousness risk score to a maliciousness risk threshold; and classifying the URL based on the comparison between the maliciousness risk score and the maliciousness risk threshold; in response to determining that the maliciousness risk score exceeds the maliciousness risk threshold, classifying the URL as malicious; in response to determining that the maliciousness risk score does not exceed the maliciousness risk threshold, classifying the URL as benign.

16 Claims, 6 Drawing Sheets

USING MACHINE LEARNING FOR CLASSIFICATION OF BENIGN AND MALICIOUS WEBPAGES

FIELD OF THE DISCLOSURE

The present disclosure generally relates to network security techniques, and relates more specifically to techniques for performing classification of benign and malicious webpages.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer networking and security, most webpages contain content that is benign ("benign webpages"), however, some webpages contain content that malicious ("malicious webpages"). The malicious content on a malicious webpage is often used or installed by an attacker computer to carry out attacks on a user computer that visits the malicious webpage or sends a request to the malicious webpage. It can be difficult and time-consuming to determine whether a webpage is benign or malicious.

Present techniques to address the foregoing problem domain generally have been found to be ineffective, slow, or incomplete, so that improved solutions are needed.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example System Architecture
   2.1 URL Classifier System
      2.1.1 URL Components
      2.1.2 URL Feature Extraction Logic
      2.1.3 URL Classifier Logic
   2.2 Content Classifier System
      2.2.1 Content Feature Extraction Logic
      2.2.2 Content Classifier Logic
   2.3 Reporting System
3.0 Example Process
4.0 Implementation Mechanisms—Hardware Overview
5.0 Other Aspects of Disclosure

1.0 GENERAL OVERVIEW

A Uniform Resource Locator (URL) is a web address for a resource on a network. A website is a set of one or more related webpages accessible via a network, such as the Internet. A user computer may access a webpage via a URL. Many webpages contain content that is benign to a user computer. However, some webpages contain content that is malicious to a user computer. A malicious webpage may include malicious software ("malware") that will be downloaded and/or installed on a user computer when the user computer accesses the webpage. In one embodiment, an attacker computer may use the malware to carry out attacks on the user computer. For example, an attacker computer may use the malware to take control of the user computer, to obtain data from the user computer without permission, or to spread the malware to additional computers.

A malicious webpage may include fraudulent or deceptive content that may be used to obtain confidential information from a user or a user computer, or to deceive a user into installing malware or other unwanted software on a user computer. This type of malicious webpage is sometimes referred to as a "phishing" webpage.

Determining whether a webpage associated with a URL is benign or malicious based solely on analyzing the content of the webpage can be difficult and inefficient. Content extraction for a particular webpage may require significant network bandwidth. Likewise, content extraction requires the use of various limited computing resources, including processors and memory. Filtering out certain URLs to exclude from the content extraction process may provide efficiencies for network access and computing resources.

In an embodiment, a two-step computer-implemented classification process determines whether a webpage is benign or malicious. A URL classifier may be programmed to extract URL features from a selected URL and determine a URL risk score for the selected URL based on an analysis of the URL features. If the URL risk score exceeds a threshold, a content classifier system may be programmed to extract content features from the webpage associated with the selected URL and determine a maliciousness risk score for the selected URL based on an analysis of the content features. The resulting maliciousness risk score may be used to classify a URL as benign or malicious. The resulting maliciousness risk score and/or the classification of the URL may be sent to a reporting system that may store the results and/or generate a report regarding the results.

2.0 EXAMPLE SYSTEM ARCHITECTURE

Figure 1:
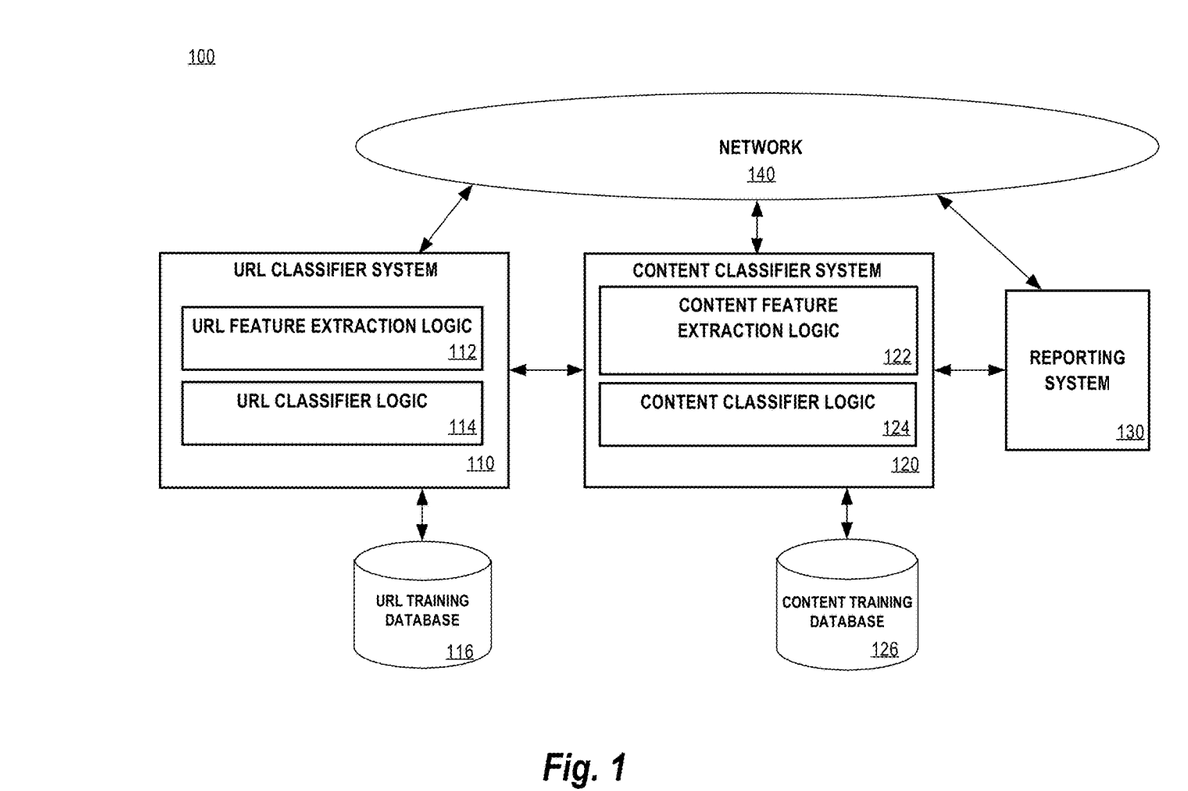
FIG. 1 illustrates a system architecture featuring a uniform resource locator (URL) classifier system and content classifier system.

FIG. 1 illustrates a system architecture for a computer system that is configured and programmed for classifying benign and malicious websites, according to one embodiment. In one embodiment, system 100 includes URL classifier system 110, content classifier system 120, and reporting system 130. In one embodiment, URL classifier system includes URL feature extraction logic 112 and URL classifier logic 114. Furthermore, URL classifier system is coupled to URL training database 116 and content classifier system 120. In one embodiment, content classifier system 120 includes content feature extraction logic 122 and content classifier logic 124. Content classifier system 120 is coupled to content training database 126 and reporting system 130. In one embodiment, URL classifier system 110, content classifier system 120, and/or reporting system 130 may each be coupled to network 140.

Network 140 may comprise one or more local networks, wide area networks, and/or may comprise the public Internet in whole or in part. Each of the systems and logic identified above may be implemented using one or more computer programs, other software elements, or a combination of software, firmware and hardware. In one embodiment, each of the functional elements shown in FIG. 1 is implemented using executables compiled or otherwise prepared based upon computer program source code organized in projects or packages of multiple files associated with different classes, and object implementations of the classes that implement functional methods. Any suitable program development environment or source language may be used including but not limited to JAVA, OBJECTIVE-C, C, C++, and the like, and flow diagrams and other illustrations are provided herein to communicate algorithms that can be used as a basis of coding operational programs. Further details regarding the features of system 100 will be described herein in other sections.

2.1 URL Classifier System

System 100 includes URL classifier system 110. URL classifier system 110 is a system that is programmed for extracting one or more URL features from a selected URL and analyzing the one or more URL features to determine a URL risk score for the selected URL.

2.1.1 URL Components

There are many types of URL features that can be extracted from a URL by URL feature extraction logic 112. URL feature extraction logic 112 may be programmed to analyze a URL and identify one or more URL components from a URL. URL feature extraction logic 112 can then extract one or more URL features from the one or more URL components.

A URL is a string and is made up of one or more URL components. A URL component is a string or numerical value that is a portion of a URL string.

A scheme is a URL component that indicates the name of the protocol to be used to fetch the resource. The scheme is typically found at the beginning of the URL. Examples of schemes include "http" (Hyper Text Transfer Protocol), "https" (Hyper Text Transfer Protocol over Secure Sockets Layer), "ftp" (File Transfer Protocol), and "file" (host-specific file names), however, many other schemes exist. For example, the URL "http://example.com" includes the scheme "http".

A resource name is a URL component that indicates the address to the resource. The resource name typically follows the scheme and is separated from the scheme by a colon (":") character. For example, the URL "http://example.com/myfile.html" includes the resource name "//example.com/myfile.html". In one embodiment, the resource name omits any leading slash ("/") characters. For example, the URL "http://example.com/myfile.html" may include the resource name "example.com/myfile.html" instead of "//example.com/myfile.html". The format of the resource name depends on the protocol used, and may further include one or more URL components. For example, the resource name of a URL that is using the HTTP protocol may include one or more URL components, such as hostname, domain, path, file name, file suffix, query string, and/or hash.

The domain is a URL component that indicates the domain of the resource. For example, the URL "http://www.example.com/file.html" includes the domain "www.example.com". The top-level domain (TLD) is a URL component that indicates the topmost level of the domain. For example, the URL "http://www.example.com/file.html" includes the TLD ".com". The pay-level domain (PLD) is a URL component that is a subdomain of the TLD, for which users usually pay for. For example, the URL "http://www.example.com/file.html" includes the PLD "example.com".

The path is a URL component that indicates the relative location of the resource, and may be made up of one or more path chunks that represent a structured hierarchy. Path chunks are URL components that are subsections of the path and indicate the structural hierarchy of the path. In one embodiment, path chunks may be separated by a slash ("/") character. For example, the URL "http://www.example.com/foo/bar" includes the path "/foo/bar" and path chunks "foo" and "bar".

The file name is a URL component that indicates the name of a resource. For example, the URL "http://www.example.com/file.html" includes the file name "file.html". The file suffix is a URL component that indicates the type of the file. For example, the URL "http://www.example.com/file.html" includes the file suffix "html".

The query string is a URL component that includes one or more parameters, that each represents a key-value pair, and follows the question-mark ("?") character in the URL string. In one embodiment, each parameter is separated by an ampersand ("&") character. Each parameter is also a URL component. Furthermore, each parameter is made up of a parameter name and a parameter value. The parameter name and the parameter value are each URL components and are often separated by an equal ("=") character. For example, the URL "http://www.example.com/file.html?k1=v1&k2=v2" includes query string "k1=v1&k2=v2", parameters "k1=v1" and "k2=v2", parameters names "k1" and "k2", and parameter values "v1" and "v2".

The hash is a URL component that indicates a pointer to a secondary resource within the first resource (e.g., a header, etc.) and follows the "#" character. For example, the URL "http://www.example.com/file.html#some-header" includes the hash "some-header".

The port number is a URL component that indicates the port number of the host that should be used to retrieve the resource. The port number typically follows a colon (":") character. For example, the URL "http://www.example.com:80/foo/bar" includes the port number "80". In cases where a port number is omitted, the port number may be assumed based on the protocol identified in the scheme.

In one embodiment, the entire URL string is a URL component.

Although only some URL components have been discussed, many other URL components may exist that are not described herein. For example, a URL that is using a different protocol may include URL components that are not described herein.

2.1.2 URL Feature Extraction Logic

URL classifier system 110 includes URL feature extraction logic 112. URL feature extraction logic 112 may be programmed to extract one or more URL features from a URL that each represents a characteristic of the URL. The extracted URL features may be used by URL classifier logic 114 to determine a URL risk score for the URL. In one embodiment, URL feature extraction logic 112 extracts one or more URL features from a URL component. There are many types of URL features that may be extracted from a URL, including n-stem URL features, n-gram URL score features, and entropy URL features. The extracted URL features may be stored by URL feature extraction logic 112.

Stem-Related URL Features

In one embodiment, URL feature extraction logic 112 is programmed to one or more n-stem URL features from one or more components of a URL. An n-stem is the first n characters of a string. For example, for the URL component "example.com", a 3-stem may be "exa" and a 4-stem may be "exam". The value of n in an n-stem may be any integer value greater than zero, although the optimal values for n are 2, 3, and/or 4. In one embodiment, an n-stem of a URL component is a URL feature. For example, URL feature extraction logic 112 can extract a 2-stem, a 3-stem, or a 4-stem from the domain of the URL. Likewise, URL feature extraction logic 112 can extract a 2-stem, a 3-stem, and/or a 4-stem from a path chunk of the URL.

In another embodiment, URL feature extraction logic 112 extracts one or more n-stem URL score features from one or more URL components of a URL. An n-stem URL score feature is a URL feature that represents the frequency with which one or more particular n-stems of a URL component of the selected URL appear in a set of reference data. The value of n may be any integer value greater than zero, although the optimal values for n are 2, 3, and/or 4.

For example, in one embodiment, URL feature extraction logic 112 determines a particular n-stem for a URL component of a URL. URL feature extraction logic 112 compares the particular n-stem for the URL component against previously-stored n-stem frequency distribution data. N-stem frequency distribution data is reference data that contains information regarding the frequency with which n-stems occur in a set of reference URLs that were previously determined to be benign or malicious. The frequency may be represented as a relative frequency that indicates how often n-stems appeared in a given URL component across the set of reference URLs. In one embodiment, feature extraction logic 112 generates n-stem frequency distribution data based on reference URLs received from URL training database 116. In one embodiment, the n-stem frequency distribution data is limited to a set of n-stems that occurred most frequently in the reference URLs. For example, n-stem frequency distribution data may be limited to the 400 most frequently occurring n-stems, and all other n-stems are treated as if they have a frequency of zero.

N-stem frequency distribution data may be stored for each value of n and/or for each URL component. By comparing the n-stem for a URL component against the previously-stored n-stem frequency distribution data, feature extraction logic 112 is able to determine an n-stem score URL feature that indicates the frequency with which a particular n-stem appears in one or more URL components in a set of benign reference URLs.

In one embodiment, a separate n-stem URL score feature may be extracted for each value of n. In one embodiment, a separate n-stem URL score feature may be extracted for each URL component. In one embodiment, an average n-stem URL score feature may be extracted that represents the average of multiple n-stem URL score features extracted for each value of n and/or each URL component. For example the URL "http://example.com/index.html" includes a domain URL component ("example.com") and a file name URL component ("index.html"), among other URL components. Given this example URL, feature extraction logic 112 may extract multiple n-stem URL score features. For example, feature extraction logic 112 may extract three different n-stem URL score features for the domain URL component for values of n where n=2, 3, or 4. Likewise, feature extraction logic 112 may extract three different n-stem URL score features for the file name URL component for values of n where n=2, 3, or 4. Additionally, feature extraction logic 112 may extract an average n-stem URL score feature that represents the average of one or more other previously extracted n-stem URL score features.

In one embodiment, URL feature extraction logic 112 extracts n-stem URL score features for the entire URL. In another embodiment, URL feature extraction logic 112 extracts n-stem URL score features for the domain of the URL. In another embodiment, URL feature extraction logic 112 extracts n-stem URL score features for one or more path chunks of the URL.

N-Gram Related URL Features

Figure 2:
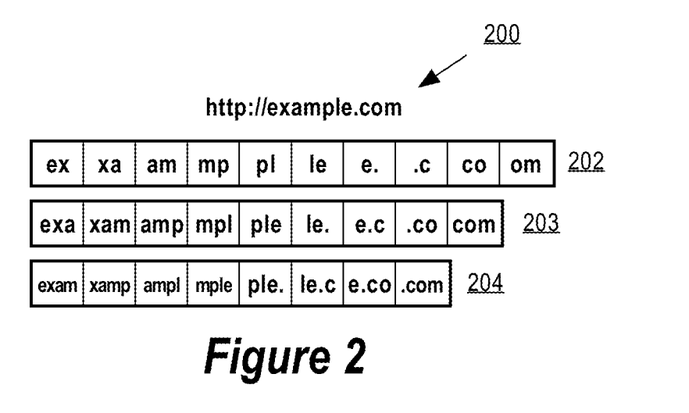
FIG. 2 illustrates an example of an n-gram of a domain name.

In another embodiment, URL feature extraction logic 112 may be programmed to extract one or more n-gram URL features from one or more URL components of a URL. An n-gram is a contiguous sequence of n characters from a string. FIG. 2 illustrates multiple n-grams for a URL component 200 ("example.com"). URL component 200 may be converted into a 2-gram 202, also known as a bigram. URL component 200 may be converted into a 3-gram 203, also known as a trigram. URL component 200 may be converted into a 4-gram 204, and so forth. The value of n in an n-gram may be any integer value greater than zero, although the optimal values for n are 2, 3, and/or 4. In one embodiment, an n-gram of a URL component may be represented by an array or other similar data structure that represents the contiguous sequence of n characters from a string, as is shown in 2-gram 202, 3-gram 203, and 4-gram 204. Each element of an n-gram array may be referred to as an n-gram entry. For example, 2-gram 202 includes a separate n-gram entry for "ex", "xa", "am", "mp", etc. In one embodiment, an n-gram of a URL component is a URL feature. For example, URL feature extraction logic 112 can extract and use an n-gram for the TLD of the URL as a URL feature.

In another embodiment, URL feature extraction logic 112 can extract an n-gram URL score feature for a URL component. An n-gram URL score feature is a URL feature that represents the frequency with which one or more n-gram entries in one or more n-grams of a URL component appear in a set of reference data. The reference data includes n-grams of URL components of a plurality of reference URLs.

In one embodiment, URL feature extraction logic 112 determines a particular n-gram for a URL component. URL feature extraction logic 112 compares each n-gram entry in the n-gram against previously-stored n-gram frequency distribution data. N-gram frequency distribution data is reference data that contains information regarding the frequency with which n-gram entries occur in a set of reference URLs that were previously determined to be benign or malicious. The frequency may be represented as a relative frequency that indicates how often n-gram entries appeared in a given URL component across the set of reference URLs. In one embodiment, URL feature extraction logic 112 generates n-gram frequency distribution data based on reference URLs received from URL training database 116. In one embodiment, the n-gram frequency distribution data is limited to a set of n-gram entries that occurred most frequently in the reference URLs. For example, n-gram frequency distribution data may be limited to the 400 most frequently occurring n-gram entries, and all other n-gram entries are treated as if they have a frequency of zero.

N-gram frequency distribution data may be stored for each value of n and/or for each URL component. By comparing the n-gram entry for the URL component against the previously-stored n-gram frequency distribution data, URL feature extraction logic 112 is able to determine an n-gram URL score feature that indicates the frequency with which the particular n-gram entry appears in one or more URL components in a set of reference URLs. For example, a different n-gram URL score feature may be extracted for each n-gram entry in 2-gram 202 (e.g., [ex, xa, am, mp,]), by comparing each n-gram entry against a set of previously-stored n-gram frequency distribution data. For example, the result of this operation could be the following array (or similar data structure) of n-gram URL score features: [2, 3, 3, 0, . . . ]. A higher n-gram URL score feature indicates that a particular n-gram entry occurs more frequently in the previously-stored n-gram frequency distribution data. In another embodiment, an n-gram URL score represents the cosine distance between the n-gram of the URL component of a particular URL and the n-gram of the URL component in the reference URLs.

In one embodiment, an n-gram URL score feature may be extracted that represents the average of the individual n-gram URL score features for each entry in the n-gram. In one embodiment, an n-gram URL score feature may be extracted for each value of n. In one embodiment, an n-gram URL score feature may be extracted for each URL component of a URL.

In one embodiment, an n-gram URL score feature for a URL component is the average of n-gram URL score features of the sub-parts of the URL component. For example, the path may be made up of one or more path chunks. The n-gram URL score feature for the path URL component may be determined as the average of the individual n-gram URL score features of each path chunk.

In one embodiment, an average n-gram URL score may be extracted that represents the average of one or more n-gram URL score features, which, in some cases, may be an average of averages.

In one embodiment, an n-gram URL score feature may be extracted for the entire URL string. In one embodiment, an n-gram URL score feature may be extracted for the TLD. In another embodiment, an n-gram URL score feature may be extracted for each parameter name of the URL. In another embodiment, an n-gram URL score feature may be extracted for each parameter value of the URL.

Entropy URL Features

In another embodiment, URL feature extraction logic 112 may be programmed to extract one or more entropy URL features of a URL component. An entropy URL feature is a URL feature that indicates a value that represents the amount of entropy in the characters of a URL component. For example, an entropy URL feature may be calculated as a Shannon entropy, an absolute entropy, or a normalized entropy. Shannon entropy is a value that may be calculated using known techniques, and the formula for calculating Shannon entropy is as follows: $H(X)=-\Sigma_i P(x_i) \log(P(x_i))$. Each realization $x_i$ corresponds to a single character in a string (e.g., a URL component) and probability $P(x_i)$ associated with a given character may be stated as the probability of the given character in the string. An absolute entropy is computed as an entropy URL feature. An absolute entropy is a value represents the Shannon entropy measured against the character frequency in a language (e.g., English). A normalized entropy is a value that represents the absolute entropy divided by the expected entropy for a string of the same length.

In one embodiment, one or more entropy URL features may be extracted for the entire URL, wherein the entropy URL features may be calculated as a Shannon entropy, an absolute entropy, or a normalized entropy. In one embodiment, one or more entropy URL features may be extracted for the domain of the URL, wherein the entropy URL features may be calculated as a Shannon entropy, an absolute entropy, or a normalized entropy. In one embodiment, one or more entropy URL features may be extracted from the path of the URL or a path chunk of the URL.

Additional URL Features

In one embodiment, URL feature extraction logic 112 may be programmed to extract additional features from the URL. In one embodiment, the URL itself is a URL feature. In one embodiment, a URL component is a URL feature. For example, query string, scheme, and port number may each be extracted as URL feature. URL length is a URL feature that represents the number of characters in the URL. In one embodiment, each parameter name and/or each parameter value of the query string of the URL is a URL feature. In one embodiment, URL provenance is a URL feature that may be extracted by URL feature extraction logic 112. URL provenance is a value that indicates the source of where URL classifier system 110 obtained the URL for processing (e.g., a particular database, a web crawler, etc.).

In one embodiment, URL feature extraction logic 112 can extract additional features from the path of the URL. URL path depth is a URL feature that represents the number of path chunks in the path of the URL. For example, the URL path depth of "http://www.example.com/foo/bar" is 2. In one embodiment, each path chunk is a URL feature. In another embodiment, the index of each path chunk is a URL feature. The index of a path chunk indicates its level in the structured hierarchy of the path. For example, for the path "/foo/bar", the path chunk "/foo" has a path chunk index of 0, and the path chunk "/bar" has a path chunk index of 1. In one embodiment, the path chunk index may be represented as an array or other similar data structure (e.g., [0:foo, 1:bar]).

In another embodiment, URL feature extraction logic 112 can extract additional features from the domain of the URL. For example, the domain itself can be a URL feature. Domain depth is a URL feature that represents the number of levels of the domain. For example, the domain "www.example.com" has a domain depth of 3. URL feature extraction logic 112 can extract a URL feature that is a binary value that represents whether the domain contains non-ASCII characters. Similarly, URL feature extraction logic 112 can extract a UEL feature that is a binary value that represents whether the domain is encoded in Punycode. Punycode is an encoding system used to represent Unicode with the limited character subset of ASCII supported by the Domain Name System. URL feature extraction logic 112 can extract a URL feature that is a binary value that represents whether the domain starts with a number. Domain structure is a URL feature that indicates the lengths of each level of a domain. For example, the domain "www.example.com" has a domain structure of [3, 7, 3], which may be represented as an array or another similar data structure. URL feature extraction logic 112 can use the TLD or the PLD as a URL feature. URL feature extraction logic 112 can extract a URL feature that is a binary value that represents whether the domain is found on a list of highly-trafficked websites on the web. For example, in one embodiment, the binary value can indicate whether the domain appears in the Alexa list of top 500 websites. Domain length is a URL feature that represents the number of characters in the domain. In another embodiment, URL feature extraction logic 112 can extract a URL feature that is a value that represents the number of hyphens in a domain is a URL feature. In another embodiment, URL feature extraction logic 112 can extract a URL feature that is a value that represents the number of numerical digits in a domain. For example the number of numerical digits in the domain "www.123.456.example.com" is 6. In another embodiment, URL feature extraction logic 112 can extract a URL feature that represents the number of discrete numbers in a domain. A discrete number is a discrete contiguous set of numerical digits. For example, the number of discrete numbers in the domain "www.123.456.example.com" is 2.

In an embodiment, URL feature extraction logic 112 can extract one or more URL features that are binary values that represent whether a domain contains a particular character. For example, in one embodiment URL feature extraction logic 112 can extract a URL feature that represents whether the domain contains a "m" character and another URL feature that represents whether the domain contains a "7" character.

In one embodiment, any URL component can be a URL feature.

2.1.3 URL Classifier Logic

Once URL feature extraction logic 112 has extracted one or more URL features from a URL, URL classifier logic 114 may be programmed to determine a URL risk score for the URL. URL classifier logic 114 may be implemented as one of various known classifier types, including a logistic regression classifier, a linear support vector machine classifier, a random forest classifier, a nearest neighbor classifier, a Bayesian classifier, a perceptron, or a neural network.

URL classifier logic 114 may be initially trained on a set of training data before it can be applied to the extracted URL features. URL classifier system 110 may retrieve URL training data from URL training database 116. URL training data includes a set of URLs that have been previously classified as malicious or benign. URL training data must be sufficiently large and be representative of the types of URLs that URL classifier logic 114 will be applied to. URL classifier system 110 may use URL training data to train URL classifier logic 114 using machine learning techniques.

Figure 3:
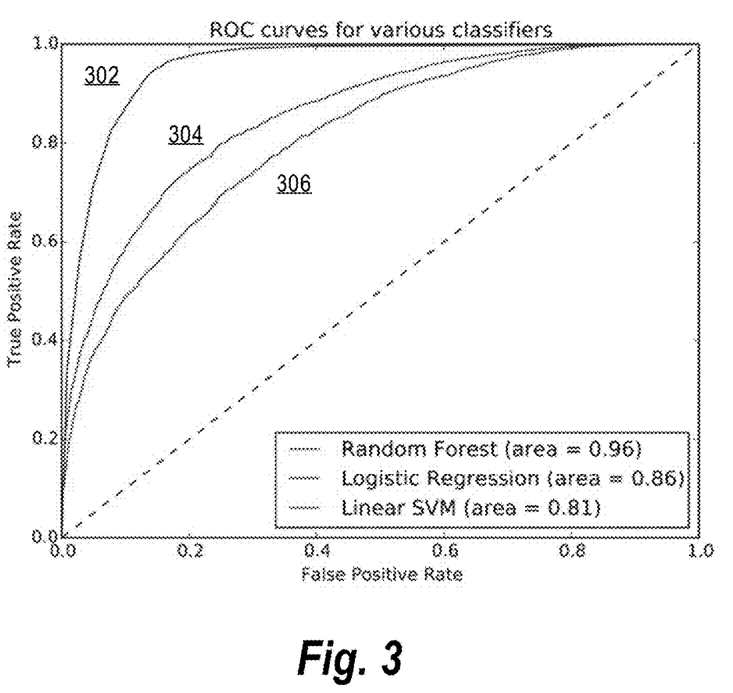
FIG. 3 illustrates an example of a receiver operating characteristics (ROC) curve.

During training, URL classifier system 110 may tune URL classifier logic 114 in order to improve the results given by URL classifier logic 114. For example, URL classifier system 110 may determine that a specific type of classifier (e.g., logistic regression classifier, linear support vector machine classifier, random forest classifier, etc.) may provide the most accurate results. For example, URL classifier system 110 may prepare receiver operating characteristic (ROC) curves that plot the true positive rate of URL classifier logic 114 against the false positive rate of URL classifier logic 114 when URL classifier logic 114 is applied to training data. FIG. 3 illustrates exemplary ROC curves for a random forest classifier 302, logistic regression classifier 304, and linear support vector machine classifier 306. In general, the closer that the ROC curve follows the left-hand border and top border of the graph, the more accurate the test is. The area under the curve (AUC) of a ROC curve can be used to evaluate a classifier's accuracy. A larger AUC indicates that a particular ROC curve is more accurate. Thus, in FIG. 3, the random forest classifier 302 is the most accurate classifier and the linear support vector machine classifier 306 is the least accurate. URL classifier system 110 can analyze such ROC curves in order to tune URL classifier logic 114 to be implemented as the most accurate classifier type.

Similarly, URL classifier system 110 may determine various F-scores for applying classifier logic 114 to different sets of features. An F-score is a measure of a test's accuracy and measures the precision (e.g., positive predictive value) and recall (e.g., sensitivity) of a test to compute a score. URL classifier system 110 may tune URL classifier logic 114 by analyzing various F-scores obtained when applying URL classifier logic 114 to training data, and determining a subset of one or more features to continue using that provides the most accurate test results.

URL classifier logic 114 may perform data preprocessing on the one or more extracted features in order to ensure that the features are formatted in a way that is usable by the classifier logic 114 in its subsequent training and classification processes. First, URL classifier logic 114 encodes features that represent categorical data or non-numerical data using a one-hot encoding algorithm. For example, a feature that is represented as categorical or string data can be converted to numerical data using one-hot encoding techniques. Next, URL classifier logic 114 normalizes the features to ensure that no one feature has a larger average numerical value that dominates the training process.

URL classifier logic 114 may perform data preprocessing on the one or more extracted features in order to ensure that the features are formatted in a way that is usable by the URL classifier logic 114 in its subsequent training and classification processes. First, URL classifier logic 114 encodes features that represent categorical data using a one-hot encoding algorithm. For example, a feature that indicates a non-numerical value be converted to numerical data using one-hot encoding techniques. Next, URL classifier logic 114 normalizes the features to ensure that no one feature has a larger average numerical value that dominates the training process.

Once URL classifier logic 114 is trained, URL classifier logic 114 can be applied to the one or more URL features extracted from the selected URL in order to analyze the one or more URL features of the selected URL and determine a URL risk score based on its analysis of the one or more features. URL risk score represents a risk value associated with the selected URL that the selected URL contains malicious content.

Once the URL risk score is determined, URL classifier system 110 may be programmed to compare the URL risk score against a URL risk score threshold. The URL risk score threshold is a configurable threshold setting that may be pre-stored. If the URL risk score exceeds the URL risk score threshold, then the URL has a reasonable likelihood of containing malicious content. Accordingly, the URL classifier system 110 can send the URL and/or URL risk score to content classifier system 120 for further analysis. If the URL risk score does not exceed the URL risk score threshold, then the URL has a reasonable likelihood of containing benign content. In one embodiment, when the URL risk score does not exceed the URL risk score threshold, the URL classifier system sends a request to the reporting system 130 to classify the URL as benign.

URL classifier system 110 can repeat the feature extraction and classification for multiple URLs.

URL risk score is determined without analyzing the content of the webpage found at the selected URL. System 100 is thus able to make a determination of a URL risk score based on analyzing the selected URL that will help identify the riskiest URLs that require a more detailed analysis via content classifier system 120 to determine whether the webpage associated with the selected URL is benign or malicious. By designing the invention this way, system 100 offers efficiencies in the use of computing resources and bandwidth, as content extraction and analysis is not performed for a selected URL when its URL risk score does not exceed a URL risk score threshold.

2.2 Content Classifier System

System 100 includes content classifier system 120. Content classifier system 120 may be programmed for extracting one or more content features from a webpage associated with a selected URL and analyzing the one or more content features to determine a maliciousness risk score for the selected URL. Webpage content may include the HyperText Markup Language (HTML) of the webpage associated with the selected URL (or similar markup language), the HTTP response received in response to sending an HTTP request for the selected URL, or any other file or resource associated with the selected URL (e.g., images, media, plugins, cookies, Cascading Style Sheet, JavaScript, etc.).

2.2.1 Content Feature Extraction Logic

Content classifier system 120 includes content feature extraction logic 122. Content feature extraction logic 122 may be programmed to retrieve webpage content associated with the selected URL, for example by an HTTP request over network 140. Content feature extraction logic 122 extracts one more content features from the webpage content that each represents a characteristic of the webpage content. The extracted content features may be used by content classifier logic 124 to determine a maliciousness risk score for the URL. There are many types of content features that may be extracted, including, character count features, text-to-image ratio features, text distance features, entropy score features, and URL risk score features. The extracted content features may be stored by content feature extraction logic 122.

Character Count Feature

In one embodiment, content feature extraction logic 122 may be programmed to extract one or more character count features from the webpage content associated with the selected URL. Character count features are content features of the webpage content. In one embodiment, unique character count is a content feature that represents the number of unique characters found in the webpage content. In one embodiment, unique character count is case-sensitive, so that characters of different cases (e.g., "A" and "a") are counted as separate characters. In another embodiment, unique character count is case-insensitive, so that characters of different cases (e.g., "A" and "a") are counted as a single character. Total character count is a content feature that represents the total number of characters found in the webpage content. In one embodiment, a digit count is a content feature that represents the number of occurrences of a specific numerical digit (e.g., "1" or "2") in the webpage content.

In one embodiment, a character count for a webpage is determined based on analyzing the HTML of the webpage content. In one embodiment, a character count for a webpage is limited to one subsection of the HTML of the webpage content. For example, a character count may be limited to the head of the HTML or the body of the HTML. In one embodiment, a character count for a webpage excludes the HTML tags in the HTML of the webpage. In another embodiment, a character count for a webpage includes the HTML tags in the webpage.

Text-to-Image Ratio Feature

In one embodiment, content feature extraction logic 122 may be programmed to extract a text-to-image ratio feature from the webpage content associated with the selected URL. A text-to-image ratio feature is a content feature that is a value that represents the ratio between the number of text tags (e.g., "<p>", "<li>", "<blockquote>", etc.) in HTML webpage content to the number of image tags (e.g., "<img>") in HTML webpage content. Malicious webpages oftentimes have a lower text-to-image ratio than benign webpages. Thus, a text-to-image ratio feature may be helpful in determining whether a webpage is malicious or benign.

Iframe Features

An inline frame ("iframe") is a tag in HTML that is used to embed a source document within another HTML document. In one embodiment, content feature extraction logic 122 extracts a content feature that is a binary value that represents whether the webpage content includes an iframe (e.g., an "<iframe>" tag). In another embodiment, content feature extraction logic 122 extracts a content feature that is a binary value that represents whether the webpage content includes an iframe that embeds a source document that is hosted on the same site as the webpage content. In another embodiment, content feature extraction logic 122 extracts a content feature that is a binary value that represents whether the webpage content includes an iframe that embeds a source document that is hosted on a different site (e.g., an external site) than the webpage content.

In some cases, webpage content may use a script to achieve the same functionality as an iframe. For example, some newer web browsers do not support iframes, so a script to support this functionality is necessary for compatibility purposes. In one embodiment, content feature extraction logic 122 extracts a content feature that is a binary value that represents whether the webpage content includes a script that embeds a source document that is hosted on the same site as the webpage content. In another embodiment, content feature extraction logic 122 extracts a content feature that is a binary value that represents whether the webpage content includes a script that embeds a source document that is hosted on a different site (e.g., an external site) than the webpage content.

URL Reference Features

Webpage content often includes references to URL links for additional webpage content. For example, in HTML, the "<a href=[URL_LINK_STRING]>" tag can be used to specify a URL link. In one embodiment, content feature extraction logic 122 may be programmed to extract a content feature that is a value that represents the ratio between the number of external URLs referenced in the webpage content of the selected URL and the total number of all URLs referenced in the webpage content of the selected URL. An external URL is a URL that identifies a document that is hosted on a different site than the webpage content of the selected URL.

In one embodiment, content feature extraction logic 122 may be programmed to extract a content feature that is a value that represents the ratio between the number of absolute URLs referenced in the webpage content of the selected URL and the total number of all URLs referenced in the webpage content of the selected URL. An absolute URL is a fully qualified URL that includes a scheme (e.g., "http://www.example.com/foo/bar"), as compared to a relative URL that is a partial URL that omits at least the scheme of the URL (e.g., "www.example.com/foo/bar" or "Moo/bar").

Text Distance Feature

In one embodiment, content feature extraction logic 122 may be programmed to extract a text distance feature from the webpage content associated with the selected URL. A text distance feature is a content feature and is a value that represents how dissimilar two strings are to one another. In one embodiment, a text distance feature is measured as the cosine distance between two strings. Each string is converted into a multi-dimensional vector. For example, in one embodiment, a string may be represented as a vector wherein each entry in the vector is a value that represents the frequency of a character in the string. To illustrate, the string "ABCA" could be represented by the vector [2, 1, 1] to indicate that the "A" character occurs twice, and the "B" and "C" characters occur once. Likewise, the string "ABCB" could be represented by the vector [1, 2, 1] to indicate that the "A" and "C" characters occur once, and the "B" character occurs twice. Accordingly, the cosine distance between the strings "ABCA" and "ABCB" can be determined by taking the cosine of the vectors [2, 1, 1] and [1, 2, 1].

In one embodiment, a text distance feature is measured as the edit distance between two strings. Edit distance measures the minimum number of operations (e.g., insertion, deletion, and/or substitution) required to transform one string into the other string. For example, in one embodiment, the edit distance between "good" and "food" may be represented as 1 (the substitution from "g" to "f"), while the edit distance between "good" and "goodbye" may be represented by 3 (the insertion of "b", "y", and "e"). Different algorithms for the calculation of edit distance may be used. For example, edit distance may be calculated as the Levenshtein distance, longest common subsequence (LCS) distance, Hamming distance, or Jaro-Winkler distance.

In one embodiment, the text distance feature measures the text distance between the domain of the URL (e.g., "example.com" for the URL "http://example.com"), and the page title of the webpage content. Content feature extraction logic 122 may identify the page title by retrieving the webpage content and isolating the content of the <title> tag in the HTML of the webpage content. Malicious webpages oftentimes have a page title that differs substantially from the domain of the URL. Thus, a text distance feature may be helpful in determining whether a webpage is malicious or benign.

Entropy Score Feature

In one embodiment, content feature extraction logic 122 may be programmed to extract an entropy score feature from the webpage content associated with the selected URL. Entropy score feature is a content feature that is a value that represents the amount of entropy in the text characters of the webpage content. The entropy score feature may be calculated as Shannon entropy, an absolute entropy, or a normalized entropy, using similar techniques as described earlier for the entropy URL features. In one embodiment, an entropy score feature may be determined for one subsection of the HTML of the webpage. For example, an entropy score feature may be determined for the head of the HTML, the page title, the body of the HTML, the entirety of the HTML, or some other subsection.

Kolmogorov Complexity Score Feature

In one embodiment, content feature extraction logic 122 may be programmed to extract an absolute Kolmogorov complexity score feature from the webpage content associated with the selected URL. The absolute Kolmogorov complexity score feature is content feature that is a value that represents the length of the shortest computer program that can output a given string given no inputs. For example, in one embodiment, given the string "1010101010", the shortest program that may be written to output this string may e: print "10"*5. On the other hand, given the string "0001110100", the shortest program that may be written to output this string may be: print "0001110100". The Kolmogorov complexity score can be calculated for a given string using known techniques.

In one embodiment, content feature extraction logic 122 extracts a normalized Kolmogorov complexity score feature from the webpage content associated with the selected URL. The normalized Kolmogorov complexity score feature may be calculated as the absolute Kolmogorov complexity score feature divided by the expected Kolmogorov complexity score.

The absolute Kolmogorov complexity score feature and the normalized Kolmogorov complexity score feature are content features that may be determined for the head of the HTML, the page title, the body of the HTML, the entirety of the HTML, or some other subsection of the webpage content.

Keyword Features

In one embodiment, content feature extraction logic 122 may be programmed to extract a keyword feature from the webpage content associated with the selected URL. A keyword feature is a content feature that is a value that represents the frequency with which one or more previously-stored keywords occur in the webpage content or a subsection of the webpage content. For example, the previously-stored keywords may include one or more keywords that frequently occur in malicious webpages. In one embodiment, content classifier system 120 can determine the keywords from a set of reference webpages that were previously identified as malicious. In one embodiment, the reference webpages are retrieved from content training database 126.

URL Risk Score

In one embodiment, content feature extraction logic 122 may be programmed to use the URL risk score that was determined by URL classifier system 110 as one of the extracted content features for the content classifier system 120. By doing so, the results of the initial URL risk analysis that was performed by the URL classifier system 110 is treated as a content feature that is used by the content classifier system 120 to determine a maliciousness risk score for the URL.

2.2.2 Content Classifier Logic

Once content feature extraction logic 122 has extracted one or more content features from the content of the webpage associated with the URL, content classifier logic 124 may be programmed to determine a maliciousness risk score for the URL, which represents the likelihood that a webpage associated with the ULR contains malicious content. Content classifier logic 124 may be implemented as one of various known classifier types, including a logistic regression classifier, a linear support vector machine classifier, a random forest classifier, a nearest neighbor classifier, a Bayesian classifier, a perceptron, or a neural network.

Content classifier logic 124 must be initially trained on a set of training data before it can be applied to the extracted content features. Content classifier logic 124 may retrieve content training data from content training database 126. Content training data includes a set of webpage content for URLs that have been previously identified as malicious or benign. Content training data must be sufficiently large and be representative of the types of URLs and webpage content that content classifier logic 124 will be applied to. Content classifier system 120 may use content training data to train content classifier logic 124 using machine learning techniques.

During training, content classifier system 120 may tune content classifier logic 124 to improve results in manner that is similar to the tuning that can be performed by URL classifier system 110, described earlier. Likewise, content classifier logic 124 may perform data preprocessing on the one or more extracted content features in a manner that is similar to the data preprocessing performed by URL classifier logic 114, described above.

Once content classifier logic 124 is trained, content classifier logic 124 can be applied to the one or more content features extracted from the webpage content associated with the URL in order to analyze the one or more content features and determine a maliciousness risk score based on its analysis of the one or more features. Maliciousness risk score represents a risk value associated with the selected URL that the selected URL contains malicious content based on an analysis of one or more content features.

Once the maliciousness risk score is determined, content classifier system 120 compares the maliciousness risk score against a maliciousness risk score threshold. The maliciousness risk score threshold is a configurable threshold setting that may be pre-stored. If the maliciousness risk score exceeds the maliciousness risk score threshold, then the URL has a reasonable likelihood of containing malicious content, therefore, content classifier system 120 can classify the URL as being malicious. If the content risk score does not exceed the maliciousness risk score threshold, then the URL has a reasonable likelihood of containing benign content, therefore, the content classifier system 120 can classify the URL as benign. In one embodiment, the results of the classification may be sent to reporting system 130.

Content classifier system 120 can repeat the feature extraction and classification for multiple URLs.

2.3 Reporting System

Reporting system 130 can be implemented as its own system for generating reports, or as a database that may be queried for information regarding the contents and vulnerabilities of the scanned URLs. In one embodiment, reporting system 140 is a PostgresSQL database that would allow a user or another system to perform queries on the scanned data. In one embodiment, reporting system 130 may also store information regarding the URL features and/or content features that were extracted by URL classifier system 110 and/or content classifier system 120. In one embodiment, reporting system 130 may also store the webpage content of URLs that have been analyzed by URL classifier system 110 or content classifier system 120. In one embodiment, reporting system 130 may generate and send device notifications, instant messages, social media updates, emails, spreadsheets, API notifications, or other types of updates regarding the maliciousness of URLs to third party user computers.

In one embodiment, reporting system 130 may track the maliciousness risk score for a URL over time. The webpage content of the URL may change over time, and the reporting system may record these changes to the maliciousness risk score as they occur. In one embodiment, the reporting system 130 may generate a notification regarding a change to a maliciousness risk score.

3.0 EXAMPLE PROCESS

Figure 4A:
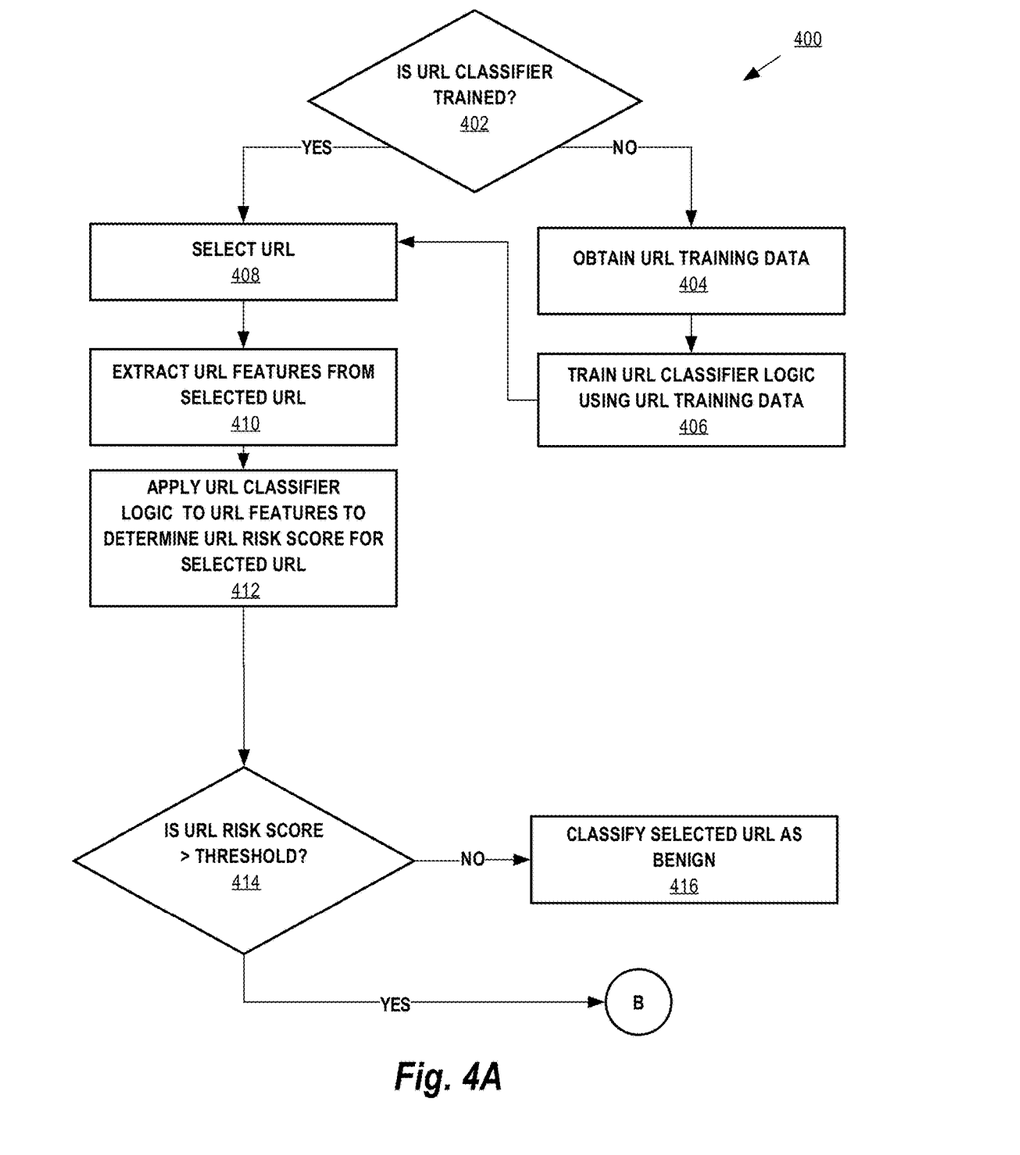
FIG. 4A illustrates a process for classification of a URL as malicious or benign.
Figure 4B:
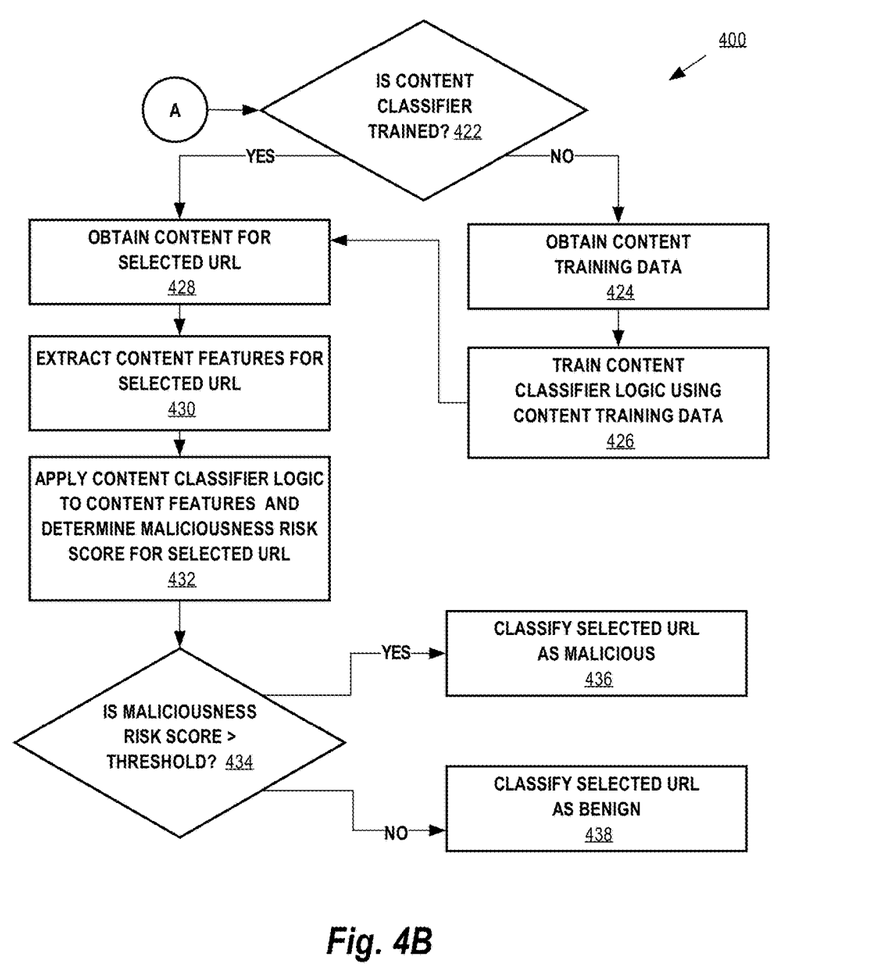
FIG. 4B illustrates other aspects of the process of FIG. 4A.

FIG. 4A and FIG. 4B illustrate a process 400 of determining a URL risk score and determining a maliciousness risk score for a URL, according to one embodiment. Process 400 may be implemented using system 100 of FIG. 1. Thus, the flow diagrams of FIG. 4A and FIG. 4B will serve as a functional specification that a skilled person may use to write, debug, execute and otherwise program one or more computer programs, methods, and/or algorithms, using any suitable language or programming environment such as JAVA, C++, OBJECTIVE-C, C, PASCAL, or to design the gate structure, layout or programming of ASICS or FPGAs, or other logic, special-purpose computers or general-purpose computers loaded with stored programs.

Referring first to FIG. 4A, in block 402, process 400 determines whether URL classifier logic 114 is trained. If URL classifier logic 114 is not trained, then control passes to block 404. If URL classifier logic 114 is trained, then control passes to block 408.

At block 404, URL classifier system 110 obtains URL training data. For example, URL classifier system 110 may obtain URL training data from a database, such as URL training database 116. The process 400 then passes control to block 406.

At block 406, URL classifier system 110 uses URL training data to train URL classifier logic 114. During this step, URL classifier system 110 may also perform tuning on the URL classifier logic 114, such as selecting a particular classifier type (e.g., logistic regression classifier, linear support vector machine classifier, random forests classifier, etc.) for classifier logic 114, or selecting one or more URL features for URL classifier logic 114 to analyze going forward. Once URL classifier logic 114 is sufficiently trained, the process 400 passes control to block 408.

At block 408, URL classifier system 110 selects a URL to analyze from a plurality of URLs. For example, in one embodiment, classifier system 110 selects a URL from a plurality of URLs in a database. The process 400 then passes control to block 410.

At block 410, URL feature extraction logic 112 extracts one or more URL features from the selected URL that was selected in block 408. In one embodiment, the one or more URL features are stored. The process 400 then passes control to block 412.

At block 412, URL classifier system 110 uses URL classifier logic 114 that was previous trained by applying it to the one or more extracted URL features in order to determine a URL risk score for the selected URL. URL classifier logic 114 determines a URL risk score for the selected URL that represents a risk that the selected URL contains malicious content without performing a content extraction for the selected URL. In one embodiment, URL classifier logic 114 performs data preprocessing on the one or more URL features prior to determining a URL risk score for the selected URL. The process 400 then passes control to block 414.

At block 414, URL classifier system 110 compares the URL risk score for the selected URL to a URL risk score threshold. The URL risk score threshold represents a threshold risk level that may be pre-stored. If the URL risk score exceeds the URL risk score threshold, then the URL has a reasonable likelihood of containing malicious content. Accordingly, the URL classifier system 110 can send the URL and/or URL risk score to content classifier system 120 for further analysis. The process 400 then passes control to block 422 in FIG. 4B. If the URL risk score does not exceed the URL risk score threshold, then the URL has a reasonable likelihood of containing benign content. In one embodiment, when the URL risk score does not exceed the URL risk score threshold, the process may optionally pass control to block 416. In another embodiment, when the URL risk score does not exceed the URL risk score threshold, the process may optionally end.

At block 416, URL classifier system 110 classifies the selected URL as benign. In one embodiment, URL classifier system 110 stores information to indicate that the selected URL is classified as benign. In one embodiment, URL classifier system 110 sends a request to reporting system 130 to indicate that the selected URL should be classified as benign. In another embodiment, URL classifier system 110 sends the extracted one or more features of the selected URL to reporting system 130.

Referring to FIG. 4B, in block 422, process 400 determines whether content classifier logic 124 is trained. If content classifier logic 124 is not trained, then control passes to block 424. If content classifier logic 124 is trained, then control passes to block 428.

At block 424, content classifier system 120 obtains content training data. For example, content classifier system 120 may obtain content training data from a database, such as content training database 126. The process 400 then passes control to block 426.

At block 426, content classifier system 120 uses content training data to train content classifier logic 124. During this step, content classifier system 120 may also perform tuning on the content classifier logic 114, such as selecting a particular classifier type (e.g., logistic regression classifier, linear support vector machine classifier, random forests classifier, etc.) for classifier logic 124, or selecting one or more content features for content classifier logic 124 to analyze going forward. Once content classifier logic 124 is sufficiently trained, the process 400 passes control to block 428.

At block 428, content classifier system 120 obtains webpage content for the selected URL. In one embodiment, content classifier system 120 obtains webpage content for the selected URL by performing a request over network 140. In one embodiment, classifier system 120 may check whether it has previously-stored webpage content for the selected URL. If the classifier system 120 determines that the previously-stored webpage content is not stale (e.g., older than a previously defined threshold period of time), then the classifier system 120 may use the previously-stored webpage content for the selected URL. The process 400 then passes control to block 430.

At block 430, content feature extraction logic 122 extracts one or more content features from the webpage content associated with the selected URL. In one embodiment, the one or more content features are stored. The process 400 then passes control to block 432.

At block 432, content classifier system 120 uses content classifier logic 124 by applying it to the one or more extracted content features in order to determine a maliciousness risk score for the selected URL. Content classifier logic 124 determines a maliciousness risk score for the selected URL that represents a risk that the selected URL contains malicious content, based in part on an analysis of the webpage contents. In one embodiment, content classifier logic 124 performs data preprocessing on the one or more content features prior to determining a maliciousness risk score for the selected URL. The process 400 then passes control to block 434.

At block 434, content classifier system 120 compares the maliciousness risk score for the selected URL to a maliciousness risk score threshold. The maliciousness risk score threshold represents a threshold risk level that may be pre-stored. If the maliciousness risk score exceeds the maliciousness risk score threshold, then the URL has a reasonable likelihood of containing malicious content. Accordingly, the content classifier system 120 can classify the selected URL as malicious. The process 400 then passes control to block 436. If the maliciousness risk score does not exceed the maliciousness risk score threshold, then the URL has a reasonable likelihood of containing benign content. In one embodiment, when the maliciousness risk score does not exceed the URL risk score threshold, the process may optionally pass control to block 436. In another embodiment, when the URL risk score does not exceed the URL risk score threshold, the process may optionally end.

At block 436, content classifier system 120 classifies the selected URL as malicious. In one embodiment, content classifier system 120 stores information to indicate that the selected URL is classified as malicious. In one embodiment, content classifier system 120 sends a request to reporting system 130 to indicate that the selected URL should be classified as malicious. In another embodiment, content classifier system 120 sends the extracted one or more content features of the selected URL to reporting system 130. Reporting system 130 may optionally generate a report or send a notification to a third party computer regarding the classification of the selected URL.

At block 438, content classifier system 120 classifies the selected URL as benign. In one embodiment, content classifier system 120 stores information to indicate that the selected URL is classified as benign. In one embodiment, content classifier system 120 sends a request to reporting system 130 to indicate that the selected URL should be classified as benign. In another embodiment, content classifier system 120 sends the extracted one or more content features of the selected URL to reporting system 130. Reporting system 130 may optionally generate a report or send a notification to a third party computer regarding the classification of the selected URL.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
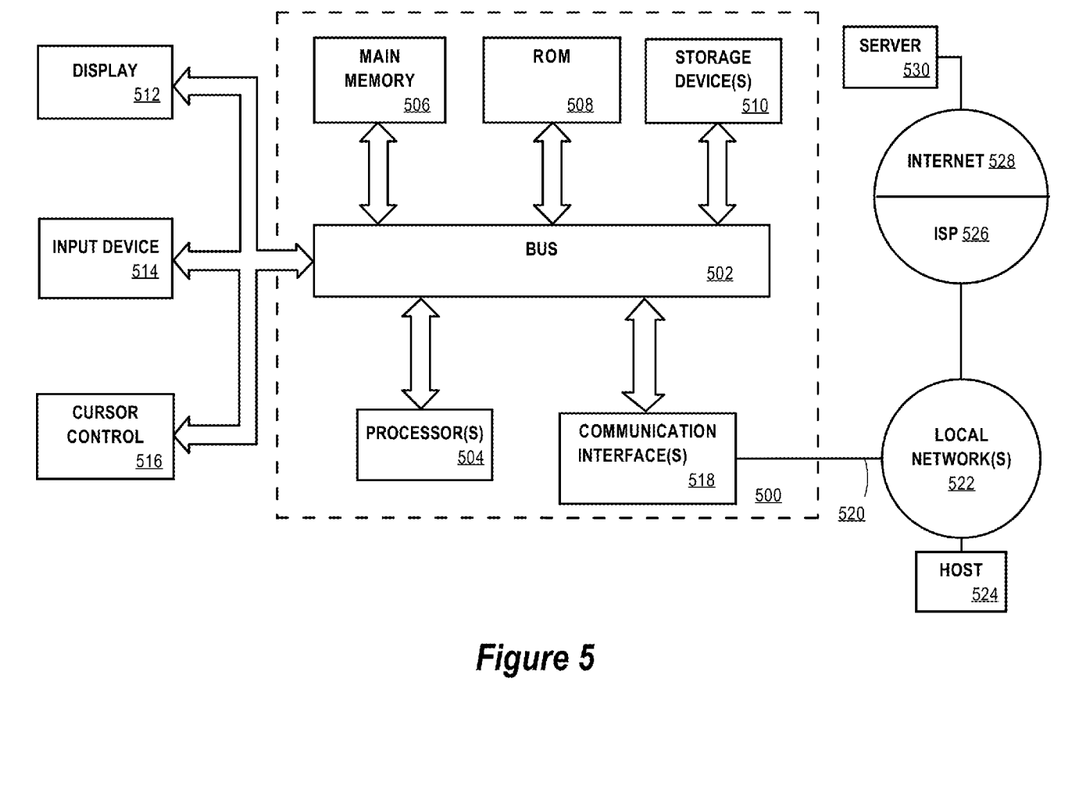
FIG. 5 illustrates a computer system upon which an embodiment of the invention may be implemented.

Referring now to FIG. 5, it is a block diagram that illustrates a special-purpose computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor.

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, webpages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

5.0 OTHER ASPECTS OF DISCLOSURE

Using the URL classifier system and content classifier system, and/or processing methods described therein, the classification of the security risk of a URL and the webpage contents of the URL is improved. In particular, by using a two-step classification system, it is possible to minimize the number of content extractions performed for URLs, as those URLs that can be identified as benign based on the URL alone do not require a content extraction or content analysis. Accordingly, the system offers many advantages over traditional classification systems, including improved bandwidth usage, memory usage, and processor usage.

Although the above examples were given primarily for webpage content obtained via a URL, the teachings of this invention can be generalized to perform a two-step classification of any sort of URL. For example, the teachings can be applied to any other protocol that is used by a URL, including, but not limited to, FTP, mailto, JDBC, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method providing an improvement in computer security, comprising:
   selecting a uniform resource locator (URL) for classification wherein the selected URL is associated with a webpage;
   determining a URL risk score for the selected URL;
   comparing the URL risk score to a URL risk threshold;
   in response to determining that the URL risk score exceeds the URL risk threshold, determining a maliciousness risk score for webpage content associated with the selected URL by retrieving the webpage content associated with the selected URL; extracting one or more content features from the webpage content, the one or more content features comprising a value that represents a text-to-image ratio of the webpage content and analyzing the webpage content by applying a content classifier to the one or more content features and to the URL risk score;
   comparing the maliciousness risk score to a maliciousness risk threshold;
   classifying the URL based on the comparison between the maliciousness risk score and the maliciousness risk threshold, wherein:
      in response to determining that the maliciousness risk score exceeds the maliciousness risk threshold, classifying the URL as malicious; and
      in response to determining that the maliciousness risk score does not exceed the maliciousness risk threshold, classifying the URL as benign;
   tracking the maliciousness risk score for the URL over time as webpage content of the URL changes over time; recording changes to the maliciousness risk score as they occur; generating and transmitting a notification regarding a change to a maliciousness risk score via any of device notifications, instant messages, social media updates, emails to third party user computers.

2. The method of claim 1, wherein the step of determining a URL risk score for the selected URL comprises:
   extracting one or more URL features of the selected URL; and
   analyzing the selected URL by applying a URL classifier to the one or more URL features of the selected URL.

3. The method of claim 2 wherein the one or more URL features of the selected URL comprise:
   a value that represents a frequency that a particular n-stem of a URL component of the selected URL appears in reference data, wherein the reference data comprises a plurality of n-stems of URL components of benign reference URLs.

4. The method of claim 2 wherein the one or more URL features of the selected URL comprise:
   a value that represents a frequency that a particular n-gram of a URL component of the selected URL appears in reference data, wherein the reference data comprises a plurality of n-grams of URL components of benign reference URLs.

5. The method of claim 2 wherein the one or more URL features of the selected URL comprise:

a value that represents entropy of a URL component of the selected URL.

6. The method of claim 1 wherein the one or more content features comprise:
a value that represents a character count of the webpage content.

7. The method of claim 1 wherein the one or more content features comprise:
a value that represents a distance measure between a page title of the webpage and a domain name of the webpage content.

8. The method of claim 1 wherein the one or more content features comprise:
a value that represents entropy of the webpage content.

9. A data processing system providing an improvement in computer security, comprising:
a plurality of security classification computers;
one or more non-transitory data storage media in the plurality of security classification computers storing classification logic comprising one or more sequences of instructions which when executed cause the security classification computers to perform:
selecting a uniform resource locator (URL) for classification wherein the selected URL is associated with a webpage;
determining a URL risk score for the selected URL;
comparing the URL risk score to a URL risk threshold;
in response to determining that the URL risk score exceeds the URL risk threshold, determining a maliciousness risk score for webpage content associated with the selected by retrieving the webpage content associated with the selected URL; extracting one or more content features from the webpage content, the one or more content features comprising a value that represents a text-to-image ratio of the webpage content; and analyzing the webpage content by applying a content classifier to the one or more content features and to the URL risk score;
comparing the maliciousness risk score to a maliciousness risk threshold;
classifying the URL based on the comparison between the maliciousness risk score and the maliciousness risk threshold, wherein:
in response to determining that the maliciousness risk score exceeds the maliciousness risk threshold, classifying the URL as malicious; and
in response to determining that the maliciousness risk score does not exceed the maliciousness risk threshold, classifying the URL as benign;
tracking the maliciousness risk score for the URL over time as webpage content of the URL changes over time; recording changes to the maliciousness risk score as they occur; generating and transmitting a notification regarding a change to a maliciousness risk score via any of device notifications, instant messages, social media updates, emails to third party user computers.

10. The data processing system of claim 9, wherein the sequence of instructions for determining a URL risk score for the selected URL comprise additional instructions which when executed cause the security classification computers to perform:
extracting one or more URL features of the selected URL; and
analyzing the selected URL by applying a URL classifier to the one or more URL features of the selected URL.

11. The data processing system of claim 10 wherein the one or more URL features of the selected URL comprise:
a value that represents a frequency that a particular n-stem of a URL component of the selected URL appears in reference data, wherein the reference data comprises a plurality of n-stems of URL components of benign reference URLs.

12. The data processing system of claim 10 wherein the one or more URL features of the selected URL comprise:
a value that represents a frequency that a particular n-gram of a URL component of the selected URL appears in reference data, wherein the reference data comprises a plurality of n-grams of URL components of benign reference URLs.

13. The data processing system of claim 10 wherein the one or more URL features of the selected URL comprise:
a value that represents entropy of a URL component of the selected URL.

14. The data processing system of claim 9 wherein the one or more content features comprise:
a value that represents a character count of the webpage content.

15. The data processing system of claim 9 wherein the one or more content features comprise:
a value that represents a distance measure between a page title of the webpage and a domain name of the webpage content.

16. The data processing system of claim 9 wherein the one or more content features comprise:
a value that represents entropy of the webpage content.

* * * * *